United States Patent
Song et al.

(10) Patent No.: US 10,133,145 B2
(45) Date of Patent: Nov. 20, 2018

(54) OPTICAL DEVICE AND METHOD OF CONTROLLING THE SAME

(71) Applicant: Agency for Science, Technology and Research, Singapore (SG)

(72) Inventors: Junfeng Song, Singapore (SG); Xianshu Luo, Singapore (SG); Patrick Guo-Qiang Lo, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 15/544,442

(22) PCT Filed: Jan. 11, 2016

(86) PCT No.: PCT/SG2016/050009
§ 371 (c)(1),
(2) Date: Jul. 18, 2017

(87) PCT Pub. No.: WO2016/118079
PCT Pub. Date: Jul. 28, 2016

(65) Prior Publication Data
US 2017/0371226 A1    Dec. 28, 2017

(30) Foreign Application Priority Data
Jan. 22, 2015   (SG) ............................. 10201500484X

(51) Int. Cl.
*G02F 1/313* (2006.01)
*G02B 6/42* (2006.01)

(52) U.S. Cl.
CPC ............. *G02F 1/3133* (2013.01); *G02B 6/42* (2013.01); *G02F 2201/06* (2013.01);
(Continued)

(58) Field of Classification Search
CPC .............. G02F 1/3133; G02F 2201/06; G02F 2201/12; G02F 2201/30
See application file for complete search history.

(56) References Cited

U.S. PATENT DOCUMENTS

| 7,592,682 B2 * | 9/2009 | Kishima | ............ G02B 6/12004 257/462 |
| 7,933,483 B2 | 4/2011 | Meijer et al. | |
| 9,729,246 B2 * | 8/2017 | Ishizaka | ................ G02F 1/2257 |

(Continued)

FOREIGN PATENT DOCUMENTS

| CN | 101882623 B | 7/2011 |
| JP | 2669101 B2 | 10/1997 |

(Continued)

OTHER PUBLICATIONS

International Preliminary Report on Patentability for International Application No. PCT/SG2016/050009 dated Nov. 29, 2016, pp. 1-16.

(Continued)

*Primary Examiner* — Daniel Petkovsek
(74) *Attorney, Agent, or Firm* — Winstead, P.C.

(57) ABSTRACT

According to embodiments of the present invention, an optical device is provided. The optical device includes a waveguide structure including a floating gate, and an optical waveguide arranged spaced apart from the floating gate, wherein the optical waveguide overlaps with the floating gate, a carrier injection portion arranged spaced apart from the floating gate, and an electrode arrangement, wherein, in response to a first voltage difference applied to the electrode arrangement, the optical device is configured to inject charge carriers from the carrier injection portion to the floating gate to cause a change in refractive index of the waveguide structure, and wherein, in response to a second voltage difference applied to the electrode arrangement, the optical (Continued)

device is configured to drive the charge carriers from the floating gate to the optical waveguide to deplete the charge carriers.

16 Claims, 11 Drawing Sheets

(52) U.S. Cl.
CPC ...... *G02F 2201/12* (2013.01); *G02F 2201/30* (2013.01); *G02F 2203/15* (2013.01); *H05K 999/99* (2013.01)

(56) References Cited

U.S. PATENT DOCUMENTS

| | | |
|---|---|---|
| 2007/0114630 A1 | 5/2007 | Kishima |
| 2009/0263076 A1 | 10/2009 | Mathai et al. |
| 2015/0063801 A1 | 3/2015 | Ishizaka |

FOREIGN PATENT DOCUMENTS

| | | |
|---|---|---|
| WO | 02093203 A2 | 11/2002 |
| WO | 2013146620 A1 | 10/2013 |

OTHER PUBLICATIONS

Barrios et al., "Silicon Photonic Read-Only Memory," Journal of Lightwave Technology, vol. 24, No. 7, Jul. 2006, pp. 2898-2905.
Song et al., "Three-Dimensional (3D) Monolithically Integrated Photodetector and WDM Receiver Based on Bulk Silicon Wafer," Optics Express, vol. 22, No. 16, Aug. 11, 2014, pp. 19546-19554.

\* cited by examiner

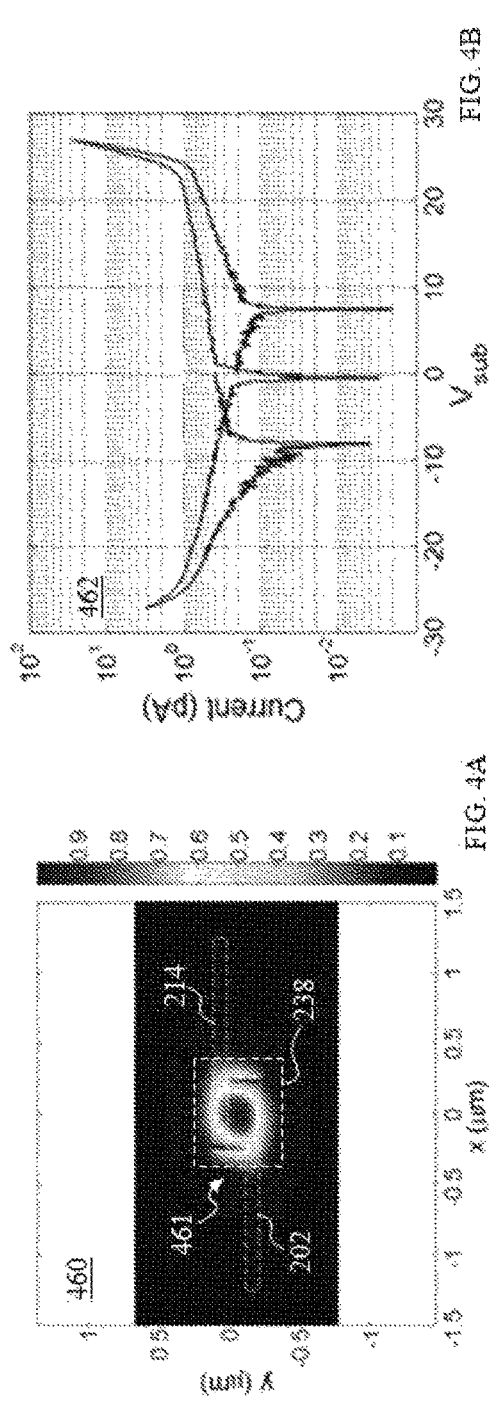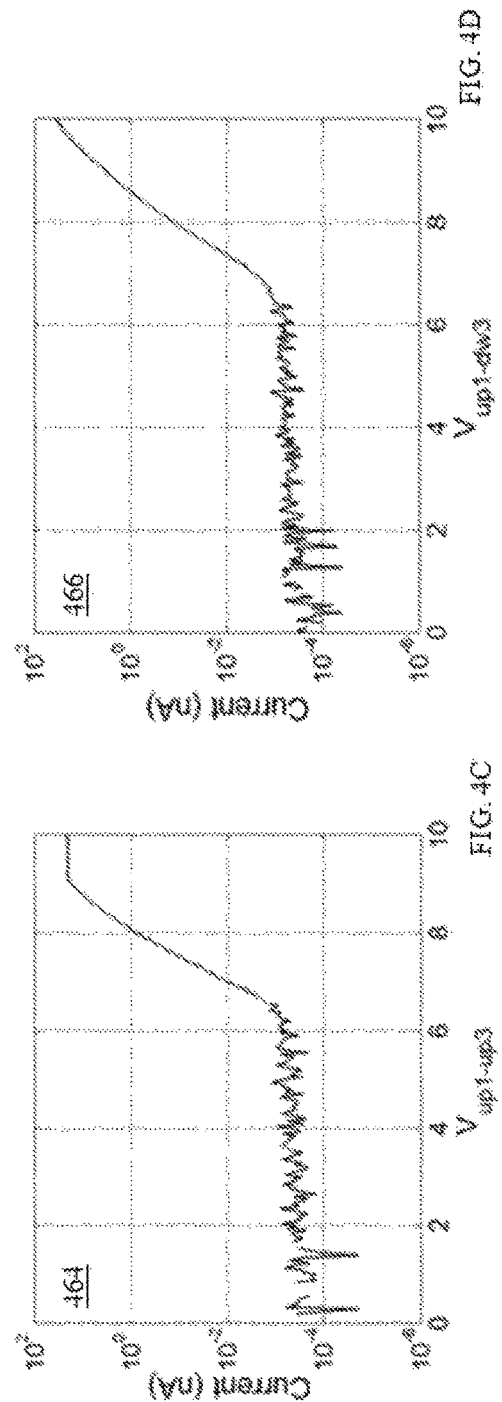

OPTICAL DEVICE AND METHOD OF CONTROLLING THE SAME

CROSS-REFERENCE TO RELATED APPLICATION

This application claims the benefit of priority of Singapore patent application No. 10201500484X, filed 22 Jan. 2015, the content of it being hereby incorporated by reference in its entirety for all purposes.

TECHNICAL FIELD

Various embodiments relate to an optical device and a method of controlling an optical device.

BACKGROUND

Optical interconnect has great importance nowadays due to the increasing demand of information data capacity. Due to its mature CMOS (complementary metal-oxide semiconductor) technology and strong industry interests, silicon photonics integrated circuits (Si-PIC) have gained much more research interests for optical interconnection. Yet, optical interconnection using Si-PIC still faces major issues, among which the energy consumption is the most challenging one when compared to their electrical counterpart. It is even critical for an optical switch, which is one of the most important building blocks or key components in on-chip optical interconnect, in the form of optical router, ROADM (reconfigurable optical add-drop multiplexer), WSS (wavelength selective switch), OXC (optical cross-connect), etc. In general, an on-chip optical switch requires power supply (i.e., consumes energy) in order to maintain the "on" status, which induces relatively high standby power consumption.

There is therefore need for an optical switch that saves energy or power consumption.

SUMMARY

According to an embodiment, an optical device is provided. The optical device may include a waveguide structure including a floating gate, and an optical waveguide arranged spaced apart from the floating gate, wherein the optical waveguide overlaps with the floating gate, a carrier injection portion arranged spaced apart from the floating gate, and an electrode arrangement, wherein, in response to a first voltage difference applied to the electrode arrangement, the optical device is configured to inject charge carriers from the carrier injection portion to the floating gate to cause a change in refractive index of the waveguide structure, and wherein, in response to a second voltage difference applied to the electrode arrangement, the optical device is configured to drive the charge carriers from the floating gate to the optical waveguide to deplete the charge carriers.

According to an embodiment, a method of controlling an optical device is provided. The method may include applying a first voltage difference to an electrode arrangement of the optical device to inject charge carriers from a carrier injection portion of the optical device to a floating gate of the waveguide structure to cause a change in refractive index of the waveguide structure, wherein the carrier injection portion is arranged spaced apart from the floating gate, and applying a second voltage difference to the electrode arrangement to drive the charge carriers from the floating gate to an optical waveguide of the waveguide structure to deplete the charge carriers, wherein the optical waveguide is arranged spaced apart from the floating gate and overlapping with the floating gate.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIG. 2A shows a perspective view of an optical device, while

FIG. 4A shows a diagram of simulated optical mode of the waveguide structure.

FIG. 4B shows a plot of current-voltage (I-V) curve between the source and the control gate.

FIG. 4C shows a plot of current-voltage (I-V) curve between the source and an N-type floating gate.

FIG. 4D shows a plot of current-voltage (I-V) curve between the source and a P-type floating gate.

DETAILED DESCRIPTION

Figure 1A:
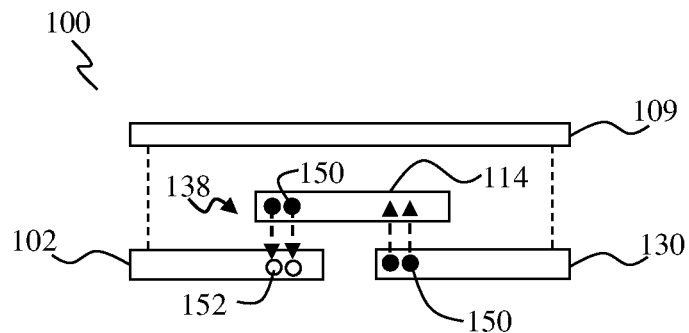
FIG. 1A shows a schematic cross-sectional view of an optical device, according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the phrase "at least substantially" may include "exactly" and a reasonable variance.

In the context of various embodiments, the term "about" as applied to a numeric value encompasses the exact value and a reasonable variance.

As used herein, the term "and/or" includes any and all combinations of one or more of the associated listed items.

Various embodiments may relate to silicon photonics, dynamic random-access memory (DRAM) interface, and electrical integrated circuit (IC) and photonics integrated circuit (PIC) integration.

Various embodiments may provide optical structures with memory and programmable function, for example, optical waveguide structures with non-volatile memory and programmable function.

Various embodiments may provide an optical waveguide structure with memory and programming functions to address the challenges of conventional optical switches. By using such a waveguide structure, an optical switch only requires dynamic power supply (e.g., pulsed electrical signal) in order to switch on, while there is no power required during the steady states since the nature of the memory state is "non-volatile". Therefore, various embodiments may provide an optical switch with memory capability to save energy or power consumption.

Various embodiments may provide an optical device including a waveguide portion, a conductor injection portion (e.g., (conductor) slab portion associated with a source terminal) arranged laterally to the waveguide portion, a floating gate over the waveguide portion and the conductor injection portion, a dielectric layer (or insulating or isolator material) between the floating gate and the conductor injection portion, a control electrode (e.g., control gate) over the floating gate, the control electrode extending over at least part of the conductor injection portion without extending over the waveguide portion, a first controlled electrode (e.g., source terminal) arranged laterally to the conductor injection portion, and a second controlled electrode (e.g., drain terminal) arranged laterally to the waveguide portion so that the waveguide portion and the conductor injection portion are between the first controlled electrode and the second electrode, wherein the optical device is configured so that a first voltage difference applied between the control electrode and the first controlled electrode causes injection of a charged entity (e.g., electron) from the conductor injection portion to the floating gate and a second voltage difference applied between the first controlled electrode (or the control electrode) and the second controlled electrode causes the charged entity to move to the waveguide portion to cause a change in refractive index from a first value representing a first logic state to a second value representing a second logic state without causing a change in refractive index in the conductor injection portion.

Various embodiments may reduce the operation voltage of optical switches.

Various embodiments may provide an improved DRAM interface.

Various embodiments may provide planar integration with CMOS-compatible fabrication process.

Various embodiments may provide one or more of the following: (i) relatively lower loss, (ii) lower (or small) operation voltage, (iii) silicon chip and with CMOS process, (iv) monolithic CMOS compatible process, with lower cost, (v) monolithic integration of silicon photonics integrated circuit and memory, (vi) programmable optical device, (vii) arrangement of one or more electrodes far from the waveguide or waveguide structure, and (viii) separation of the control gate and the waveguide or waveguide structure.

Various embodiments may be employed as one or more of the following: (i) on chip optical connect, optical switching, optical cross connect, tunable filter, (ii) computer core-core interconnect, and (iii) high speed optical read-out memory.

FIG. 1A shows a schematic cross-sectional view of an optical device 100, according to various embodiments. The optical device 100 includes a waveguide structure 138 including a floating gate 114 and an optical waveguide 102 arranged spaced apart from the floating gate 114, wherein the optical waveguide 102 overlaps with the floating gate 114, a carrier injection portion 130 arranged spaced apart from the floating gate 114, and an electrode arrangement 109, wherein, in response to a first voltage difference applied to the electrode arrangement 109, the optical device 100 is configured to inject charge carriers 150 from the carrier injection portion 130 to the floating gate 114 to cause a change in refractive index of the waveguide structure 138, and wherein, in response to a second voltage difference applied to the electrode arrangement 109, the optical device 100 is configured to drive the charge carriers 150 from the floating gate 114 to the optical waveguide 102 to deplete the charge carriers 150.

In other words, an optical device 100 may be provided. The optical device 100 may include a floating gate 114 and an optical waveguide 102 defining a waveguide structure 138. The optical waveguide 102 may be arranged overlapping with the floating gate 114. The floating gate 114 may be spaced apart from the optical waveguide 102. The optical waveguide 102 may be electrically insulated from the floating gate 114. The floating gate 114 may be arranged over the optical waveguide 102. In this way, the optical waveguide 202 may define a lower portion of the waveguide structure 138 while the floating gate 114 may define an upper portion of the waveguide structure 138.

An optical mode (or optical signal) may propagate through the waveguide structure 138. The optical mode may be confined by the overlapping portions of the optical waveguide 102 and the floating gate 114.

The optical device 100 may further include a carrier injection portion 130 arranged spaced apart from the floating gate 114. The carrier injection portion 130 may be electrically insulated from the floating gate 114. The carrier injection portion 130 may overlap with the floating gate 114. The carrier injection portion 130 may be in the form of a slab portion.

In various embodiments, the optical waveguide 102 may be arranged laterally to the carrier injection portion 130.

In various embodiments, the optical waveguide 102 and the carrier injection portion 130 may be arranged coaxially.

In various embodiments, the optical waveguide 102 may overlap with a first portion of the floating gate 114 while the carrier injection portion 130 may overlap with a second portion of the floating gate 114. The first portion and the second portion are separate portions of the floating gate 114.

An electrode arrangement 109 may further be provided in the optical device 100 for application of at least one voltage difference or electric field between respective regions of the optical device 100. The electrode arrangement 109 may be electrically coupled to the optical waveguide 102 and the carrier injection portion 130. For example, one electrode of the electrode arrangement 109 may be electrically coupled to the optical waveguide 102, while another electrode of the electrode arrangement 109 may be electrically coupled to the carrier injection portion 130.

When a first voltage difference is applied to the electrode arrangement 109, the optical device 100 may inject (free) charge carriers 150 from the carrier injection portion 130 to the floating gate 114 to cause a change in (effective) refractive index of the waveguide structure 138. The charge carriers 150 may be maintained in the floating gate 114. For example, the injected charge carriers 150 may be located at a portion of the floating gate 114 overlapping with the optical waveguide 102.

By injecting the charge carriers 150 from the carrier injection portion 130 to the floating gate 114, the refractive index of the waveguide structure 138 or the refractive index of the optical waveguide 102 may change from an initial refractive index (e.g., when no charge carriers are present in the floating gate 114) to a changed refractive index. The change in the refractive index of the waveguide structure 138 or of the optical waveguide 102 may induce an optical phase change in an optical mode that may propagate through the waveguide structure 138. The changed optical phase of the optical mode may define a first state (e.g., a first logic state "1").

When a second voltage difference is applied to the electrode arrangement 109, the optical device 100 may drive the charge carriers 150 from the floating gate 114 to the optical waveguide 102 to deplete the charge carriers 150. The charge carriers 150 may therefore be removed from the floating gate 114. The first voltage difference and the second voltage difference may be applied between respective different parts of the electrode arrangement 109.

In response to the second voltage difference applied to the electrode arrangement 109, additional charge carriers 152 that are charged oppositely to the charge carriers 150 may be provided or driven to the optical waveguide 102. In this way, by driving the charge carriers 150 from the floating gate 114 to the optical waveguide 102, the charge carriers 150 may be depleted by recombining with the additional charge carriers 152 that are oppositely charged that are present in the optical waveguide 102.

As a result of depleting the charge carriers 150, for example, by recombining with the oppositely charged additional charge carriers 152, the refractive index of the waveguide structure 138 or the refractive index of the optical waveguide 102 may change back to the initial refractive index (e.g., when no charge carriers are present in the floating gate 114). Consequently, the optical mode propagating through the waveguide structure 138 may revert back to its original optical phase, thereby defining a second state (e.g., a second logic state "0").

In the context of various embodiments, the (free) charge carriers 150 injected from the carrier injection portion 130 to the floating gate 114 may be electrons, while the additional charge carriers 152 may be holes.

In the context of various embodiments, the optical waveguide 102 may include or may be made of crystalline silicon (C—Si).

In the context of various embodiments, the carrier injection portion 130 may include or may be made of crystalline silicon (C—Si).

In the context of various embodiments, the floating gate 114 may be made of a conductive material, e.g., a semiconductor or a conductor material. As a non-limiting example, the floating gate 114 may include or may be made of polycrystalline silicon (Poly-Si).

In various embodiments, the waveguide structure 138 may include an insulating material in between the optical waveguide 102 and a portion (e.g., a first portion) of the floating gate 114 overlapping with the optical waveguide 102. In this way, the optical waveguide 102 may be electrically insulated from the floating gate 114. In response to the second voltage difference applied to the electrode arrangement 109, the charge carriers 150 may tunnel through the insulating material between the optical waveguide 102 and the floating gate 114.

In various embodiments, an insulating material may be provided in between the carrier injection portion 130 and another portion (e.g., a second portion) of the floating gate 114 overlapping with the carrier injection portion 130. In this way, carrier injection portion 130 may be electrically insulated from the floating gate 114.

In various embodiments, the electrode arrangement 109 may include a control gate terminal, wherein the floating gate 114 may be arranged in between the control gate terminal and the carrier injection portion 130, a first source/drain terminal coupled to the carrier injection portion 130, and a second source/drain terminal coupled to the optical waveguide 102. The first source/drain terminal may be electrically coupled to the carrier injection portion 130. The second source/drain terminal may be electrically coupled to the optical waveguide 102.

The control gate terminal may be arranged overlapping with the floating gate 114, for example, overlapping with the second portion of the floating gate 114. The control gate terminal may be arranged spaced apart from the floating gate 114. The control gate terminal may be electrically insulated from the floating gate 114. This may mean that an insulating material or a dielectric material may be provided in between the control gate terminal and the floating gate 114.

The control gate terminal may include an electrode and a doped portion coupled to the gate electrode, the doped portion including dopants of a first conductivity type (e.g., N-type). The doped portion may be heavily doped with dopants of the first conductivity type. The doped portion coupled to the electrode of the control gate terminal may be made of a semiconductor or a conductor material.

The first source/drain terminal may include an electrode and a doped portion coupled to the electrode, the doped portion including dopants of a first conductivity type (e.g., N-type). The doped portion may be heavily doped with dopants of the first conductivity type.

The second source/drain terminal may include an electrode and a doped portion coupled to the electrode, the doped portion including dopants of a second conductivity type (e.g., P-type). The doped portion may be heavily doped with dopants of the second conductivity type.

The control gate terminal, the first source/drain terminal and the second source/drain terminal may form part of a MOSFET (metal-oxide-semiconductor field-effect transistor).

In the context of various embodiments, the term "source/drain terminal" of a transistor may refer to a source terminal or a drain terminal. As the source terminal and the drain terminal of a transistor are generally fabricated such that these terminals are geometrically symmetrical, these terminals may be collectively referred to as source/drain terminals. In various embodiments, a particular source/drain terminal may be a "source" terminal or a "drain" terminal depending on the voltage to be applied to that terminal. Accordingly, the terms "first source/drain terminal" and "second source/drain terminal" may be interchangeable.

In various embodiments, the first source/drain terminal may be the source terminal while the second source/drain terminal may be the drain terminal.

In various embodiments, the first voltage difference may be applied between the control gate terminal and the first source/drain terminal so as to inject the charge carriers 150 from the carrier injection portion 130 to the floating gate 114 to cause the change in refractive index of the waveguide structure 138, and the second voltage difference may be applied between the control gate terminal and the second source/drain terminal so as to drive the charge carriers 150 from the floating gate 114 to the optical waveguide 102 to deplete the charge carriers 150.

In response to the first voltage difference, the optical device 100 may be configured to inject the charge carriers 150 from the carrier injection portion 130 to the floating gate 114, across the insulating material between the carrier injection portion 130 and the floating gate 114. This may mean that the charge carriers 150 may tunnel through the insulating material between the carrier injection portion 130 and the floating gate 114.

In various embodiments, the optical waveguide 102 may overlap with a first portion of the floating gate 114, and the carrier injection portion 130 may overlap with a second portion of the floating gate 114. In response to a third voltage difference applied between the control gate terminal and the second source/drain terminal, the third voltage difference being less than the second voltage difference, the optical device 100 may be configured to drive the charge carriers 150 injected from the carrier injection portion 130 to the second portion of the floating gate 114 through or along the floating gate 114 to the first portion of the floating gate 114 overlapping with the optical waveguide 102. This may mean that the charge carriers 150 may be transported from the second portion of the floating gate 114 to the first portion of the floating gate 114. The third voltage difference is insufficient to drive the charge carriers 150 from the floating gate 114 to the optical waveguide 102.

The first portion of the floating gate 114 may be non-overlapping with the carrier injection portion 130. The second portion of the floating gate 114 may be non-overlapping with the optical waveguide 102. The first portion and the second portion of the floating gate 114 may be arranged laterally from each other.

In various embodiments, in response to the third voltage difference, additional charge carriers 152 that are charged oppositely to the charge carriers 150 may be provided or driven to the optical waveguide 102 (or at least a portion thereof) overlapping with the first portion of the floating gate 114.

In various embodiments, the optical waveguide 102 may be arranged spaced apart from the carrier injection portion 130.

In various embodiments, the optical waveguide 102 may be electrically insulated from the carrier injection portion 130. This may mean that an insulating material or a dielectric material may be provided in between the optical waveguide 102 and the carrier injection portion 130.

In various embodiments, the optical waveguide 102 may include a channel waveguide or a straight waveguide.

In various embodiments, the optical waveguide 102 may include a slab waveguide portion coupled to the second source/drain terminal, the slab waveguide portion being tapered with a width increasing in a direction away from the second source/drain terminal. For example, the slab waveguide portion may be coupled to the channel waveguide and the second source/drain terminal, in between the channel waveguide and the second source/drain terminal.

In various embodiments, the floating gate 114 may include a tapering portion having a width decreasing in a direction away from the optical waveguide 102. The tapering portion may be non-overlapping with the optical waveguide 102.

In various embodiments, the floating gate 114 may include dopants. For example, the floating gate may be N-doped or P-doped.

In the context of various embodiments, the term "N-doped" or "N-type" may mean a host material (e.g., semiconductor) that is doped with doping atoms that may provide extra conduction electrons to the host material, thereby resulting in an electrically conductive N-doped host material with an excess number of mobile electrons (negatively charged carriers). Such doping atoms are also generally referred to as donors or donor atoms.

In the context of various embodiments, the term "P-doped" or "P-type" may mean a host material (e.g., semiconductor) that is doped with doping atoms that may accept weakly-bound outer electrons from the host material, thereby creating vacancies left behind by the electrons, known as holes, thereby resulting in an electrically conductive P-type host material with an excess number of mobile holes (positively charged carriers). Such doping atoms are also generally referred to as acceptors or acceptor atoms.

In the context of various embodiments, the host material may be a Group IV element, for example silicon (Si). The host material may be doped or implanted with Group III doping atoms or elements, for example boron (B), aluminum (Al) or gallium (Ga), to form a P-doped material, or doped or implanted with Group V doping atoms or elements, for example phosphorus (P), arsenic (As) or antimony (Sb), to form an N-doped material.

In various embodiments, the floating gate 114 may include a P-N junction, wherein an N-doped region of the P-N junction may overlap with the optical waveguide 102. The N-doped region and the P-doped region of the P-N junction are in contact with each other. The P-doped region of the P-N junction may overlap with the carrier injection portion 130.

In various embodiments, the floating gate 114 may include an N-P-N junction, wherein one N-doped region of the N-P-N junction may overlap with the optical waveguide 102. The other N-doped region of the N-P-N junction may overlap with the carrier injection portion 130. The P-doped region of the N-P-N junction is arranged in between the two N-doped regions of the N-P-N junction. The P-doped region of the N-P-N junction are in contact with each of the two N-doped regions of the N-P-N junction.

In various embodiments, the floating gate 114 may include a grating structure arranged overlapping with the optical waveguide 102. The grating structure may include a plurality of spaced apart fingers. The fingers may be at least substantially uniformly spaced apart from each other.

In various embodiments, the optical waveguide 102 may include a grating arranged overlapping with the floating gate 114. The grating may include alternating regions of first (e.g., high) refractive index and second (e.g., low) refractive index.

In various embodiments, a plurality of cavities (or microcavities) may be defined in the optical waveguide 102. The plurality of cavities may be defined along a longitudinal axis of the optical waveguide 102. The optical waveguide 102 may include a plurality of spaced apart waveguide portions, wherein adjacent waveguide portions are spaced apart with a respective cavity of the plurality of cavities therebetween.

In various embodiments, the optical waveguide 102 may include a ring waveguide (or a microring), and the floating gate 114 may include a ring floating gate. The ring waveguide and the ring floating gate may form part of a (micro) ring resonator defined or comprised in the optical device 100. The ring waveguide and the ring floating gate may at least substantially surround the carrier injection portion 130. The carrier injection portion 130 may be at least substantially circular.

In various embodiments, the optical device 100 may further include an additional optical waveguide optically coupled to the ring waveguide. The additional optical waveguide may act as an input waveguide to couple an optical mode or optical signal into the ring waveguide, or as an output waveguide to couple an optical mode or optical signal out of the ring waveguide.

In the context of various embodiments, the optical device 100 may be formed on a semiconductor substrate or a substrate having a III-V material. The semiconductor substrate may include a silicon-on-insulator (SOI) wafer, a germanium substrate, etc. The III-V material substrate may include gallium arsenide (GaAs), indium phosphide (InP), etc.

In the context of various embodiments, an insulating material (or isolator or dielectric material) employed in the optical device 100 may include or may be made of silicon oxide ($SiO_2$), silicon nitride (SiN), or silicon carbide (SiC).

Figure 1B:
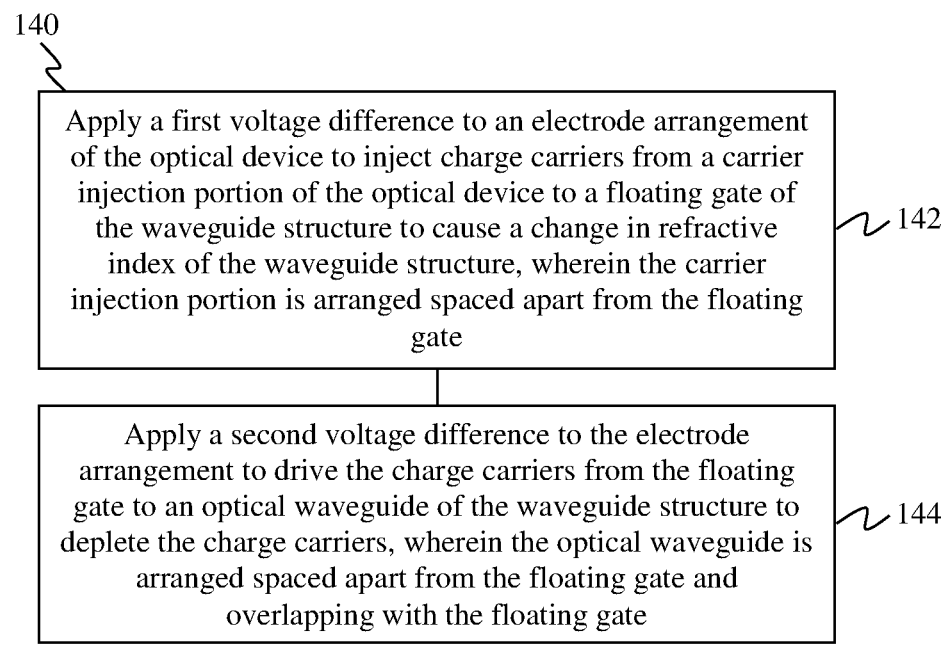
FIG. 1B shows a flow chart illustrating a method of controlling an optical device, according to various embodiments.

FIG. 1B shows a flow chart 140 illustrating a method of controlling an optical device, according to various embodiments.

At 142, a first voltage difference is applied to an electrode arrangement of the optical device to inject charge carriers from a carrier injection portion of the optical device to a floating gate of the waveguide structure to cause a change in (effective) refractive index of the waveguide structure, wherein the carrier injection portion is arranged spaced apart from the floating gate.

At 144, a second voltage difference is applied to the electrode arrangement to drive the charge carriers from the floating gate to an optical waveguide of the waveguide structure to deplete the charge carriers, wherein the optical waveguide is arranged spaced apart from the floating gate and overlapping with the floating gate.

In various embodiments, at 142, the first voltage difference may be applied between a control gate terminal of the electrode arrangement and a first source/drain terminal of the electrode arrangement, wherein the floating gate is arranged in between the control gate terminal and the carrier injection portion, and wherein the first source/drain terminal is coupled to the carrier injection portion.

In various embodiments, at 144, the second voltage difference may be applied between the control gate terminal and a second source/drain terminal of the electrode arrangement, wherein the second source/drain terminal is coupled to the optical waveguide.

In various embodiments, prior to applying the second voltage difference, a third voltage may be applied between the control gate terminal and the second source/drain terminal to drive the charge carriers injected from the carrier injection portion to a second portion of the floating gate overlapping with the carrier injection portion through the floating gate to a first portion of the floating gate overlapping with the optical waveguide, wherein the third voltage difference is less than the second voltage difference.

While the method described above is illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

It should be appreciated that descriptions in the context of the optical device 100 may correspondingly be applicable in relation to the method of controlling an optical device, and vice versa.

Figure 2A:
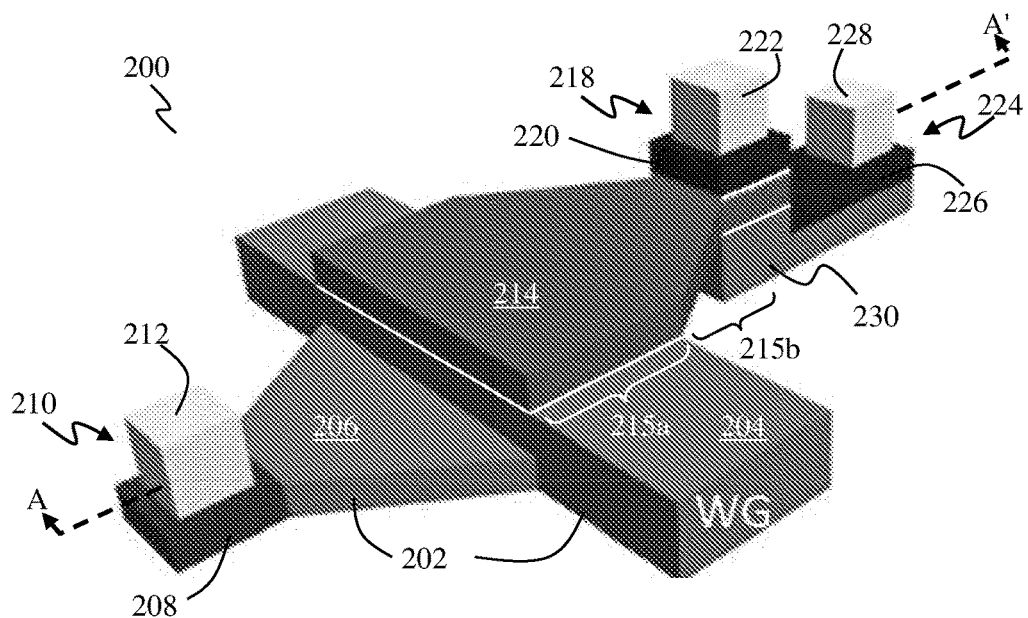
Figure 2B:
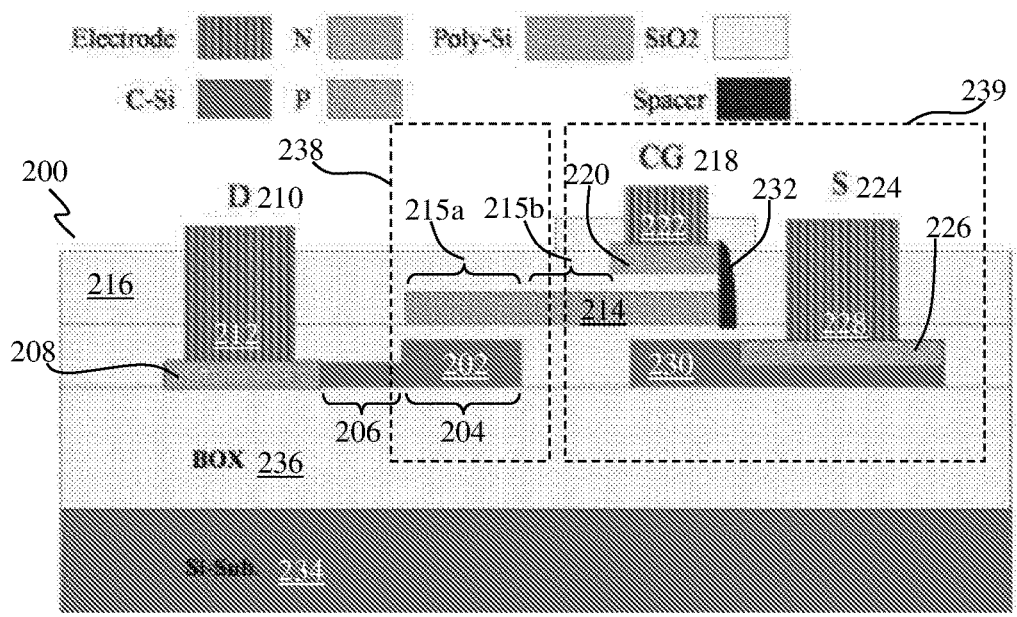
FIG. 2B shows a cross sectional view of the optical device of FIG. 2A taken along the line A-A', according to various embodiments.

FIG. 2A shows a perspective view of an optical device (or optical waveguide structure) 200, according to various embodiments, illustrating a three-dimensional (3D) view of the optical device with memory and programming function. FIG. 2B shows a cross sectional view of the optical device 200 taken along the line A-A'. The optical device 200 may include an optical waveguide 202 integrated with a MOSFET (metal-oxide-semiconductor field-effect transistor).

The optical device 200 may include an optical waveguide (e.g., having a slab waveguide) 202 which may serve as a lower part of a whole waveguide structure. The optical waveguide 202 may include a waveguide (e.g., a channel waveguide) 204 and a slab waveguide portion 206 coupled to the channel waveguide 204. The slab waveguide portion 206 may be arranged laterally from the channel waveguide 204. The slab waveguide portion 206 may be tapered, with the width increasing in the direction towards the channel waveguide 204. The optical waveguide 202, for example, the channel waveguide 204 may receive an optical signal (e.g., light). The channel waveguide 204 and the slab waveguide portion 206 may be made of crystalline silicon (C—Si). The channel waveguide 204 and the slab waveguide portion 206 may be a conductor or may be electrically conductive.

A doped (slab) portion 208 may be provided coupled to the slab waveguide portion 206, where the doped portion 208 may define an electrical drain (or drain terminal), D, 210 of a MOSFET. An electrode 212 may be electrically coupled to the doped portion 208. The doped portion 208 may be made of crystalline silicon (C—Si) and may be P-doped, for example heavily P-doped (P++).

A floating gate 214, which serves as an upper part of the whole waveguide structure, may be provided. The floating gate 214 may be a conductor or may be electrically conductive. The floating gate 214 may be arranged over the optical waveguide 202. The floating gate 214 may be arranged spaced apart from the optical waveguide 202, for example, the entire floating gate 214 may be spaced apart from the optical waveguide 202. One or more insulating (or isolation) materials (e.g., silicon oxide, SiO$_2$) 216 may be provided between the floating gate 214 and the optical waveguide 202, for example, between the floating gate 214 and the channel waveguide 204. As a non-limiting example, the floating gate 214 and the optical waveguide 202 may be separated by a thin thermal oxide formed by dry oxidation. Therefore, the floating gate 214 and the optical waveguide 202 may be electrically insulated from each other. Further, this may mean that the floating gate 214, the insulating material 216 and the optical waveguide 202 may define a capacitor structure or a MOS (metal-oxide-semiconductor) structure.

In various embodiments, the floating gate 214 may be undoped. In further embodiments, the floating gate 214 may be doped (e.g., N-doped or P-doped). For example, the floating gate 214 may be singly doped, meaning either an N-type floating gate or a P-type floating gate.

The floating gate 214 may be arranged overlapping with the optical waveguide 202, for example, overlapping with the channel waveguide 204. The floating gate 214 may include a rectangular portion 215*a* of uniform width and a tapering portion 215*b* having a width decreasing in the direction away from the optical waveguide 202 or the channel waveguide 204. The rectangular portion 215*a* may be arranged overlapping with the optical waveguide 202, for example, overlapping with the channel waveguide 204. A surface of the floating gate 214 may be arranged coplanar with a surface of the channel waveguide 204 that faces the slab waveguide portion 206. The floating gate 214 may be made of polycrystalline silicon (Poly-Si).

The floating gate 214 may be integrated with a control gate (or control gate terminal), CG, 218 and an electrical source (or source terminal), S, 224 of the MOSFET (also having the drain terminal 210). The control gate 218 may include a doped portion 220 and an electrode 222 electrically coupled to the doped portion 220. The doped portion 220 may be made of crystalline silicon (C—Si) and may be N-doped, for example heavily N-doped (N++). The source terminal 224 may include a doped portion 226 and an electrode 228 electrically coupled to the doped portion 226. The doped portion 226 may be made of crystalline silicon (C—Si) and may be N-doped, for example heavily N-doped (N++). The doped portion 226 may be formed or embedded in a carrier injection portion (e.g., in the form of a slab portion) 230. The carrier injection portion 230 may be made of crystalline silicon (C—Si). The carrier injection portion 230 may be a conductor or may be electrically conductive. The floating gate 214, the control gate 218 and the carrier injection portion 230 may be arranged coaxially, for example, in the vertical direction. It should be appreciated that the drain terminal 210, the source terminal 224 and the control gate terminal 218 may define an electrode arrangement.

The control gate 218 may be arranged over the floating gate 214. The floating gate 214 may be arranged spaced apart from the control gate 218, for example, the entire floating gate 214 may be spaced apart from the control gate 218. A portion of the floating gate 214 may be arranged overlapping with the control gate 218, for example, overlapping with the entire control gate 218. One or more insulating (or isolation) materials (e.g., silicon oxide, SiO$_2$) 216 may be provided between the floating gate 214 and the control gate 218. In this way, the floating gate 214 and the control gate 218 may be electrically insulated from each other.

The floating gate 214 may be arranged over the carrier injection portion 230. The floating gate 214 may be arranged spaced apart from the carrier injection portion 230, for example, the entire floating gate 214 may be spaced apart from the carrier injection portion 230. A portion of the floating gate 214 may be arranged overlapping with a part or region of the carrier injection portion 230. One or more insulating (or isolation) materials (e.g., silicon oxide, SiO$_2$) 216 may be provided between the floating gate 214 and the carrier injection portion 230. In this way, the floating gate 214 and the carrier injection portion 230 (and the source terminal 224) may be electrically insulated from each other.

As shown in FIGS. 2A and 2B, the floating gate 214 may be arranged between the control gate 218 and the carrier injection portion 230 (and the source terminal 224).

The optical waveguide 202 and the carrier injection portion 230 may be arranged spaced apart from each other, for example, the entire optical waveguide 202 and the entire carrier injection portion 230 may be spaced apart from each other. One or more insulating (or isolation) materials (e.g., silicon oxide, SiO$_2$) 216 may be provided between the optical waveguide 202 and the carrier injection portion 230. The optical waveguide 202 and the carrier injection portion 230 may be arranged laterally from each other. The optical waveguide 202 and the carrier injection portion 230 may be arranged coaxially, for example, in the horizontal or lateral direction.

A spacer 232 may be provided, coupled to the floating gate 214 and the control gate 218. The spacer 232 may be employed to assist in spacing apart the floating gate 214 and the control gate 218.

In the optical device 200, a section of waveguide structure 238, and a section of memory (e.g., flash memory) 239 may be defined. In the memory 239, there may be electron pumping.

The optical device 200 may be formed on a silicon-on-insulator wafer having a silicon substrate 234 and a buried oxide layer (BOX) 236. It should be appreciated that the silicon substrate 234 and the buried oxide layer (BOX) 236 and part of the one or more insulating (or isolation) materials (e.g., silicon oxide, SiO$_2$) 216 are not shown in FIG. 2A for clarity and easy understanding purposes.

While various embodiments of the optical devices, including the optical device 200 (FIGS. 2A, 2B), are described herein using SOI wafers, it should be appreciated that different material systems bearing the same operating principle may be employed, such as III-V materials (e.g., gallium arsenide (GaAs), indium phosphide (InP), etc.), germanium (Ge), etc.

It should be appreciated that the floating gate (e.g., 214, FIGS. 2A, 2B) and/or the control gate 218 (for example, the doped portion 220, FIGS. 2A, 2B) may employ either semiconductor or conductor materials. Further, it should be appreciated that the one or more isolation materials (e.g., 216, FIGS. 2A, 2B) may include but not limited to silicon oxide (SiO$_2$), silicon nitride (SiN), or silicon carbide (SiC).

The operating principle (or programming process) of the optical device of various embodiments will now be described with reference to FIGS. 3A to 3C using the optical device 200 of FIGS. 2A and 2B as a non-limiting example.

Figure 3A:
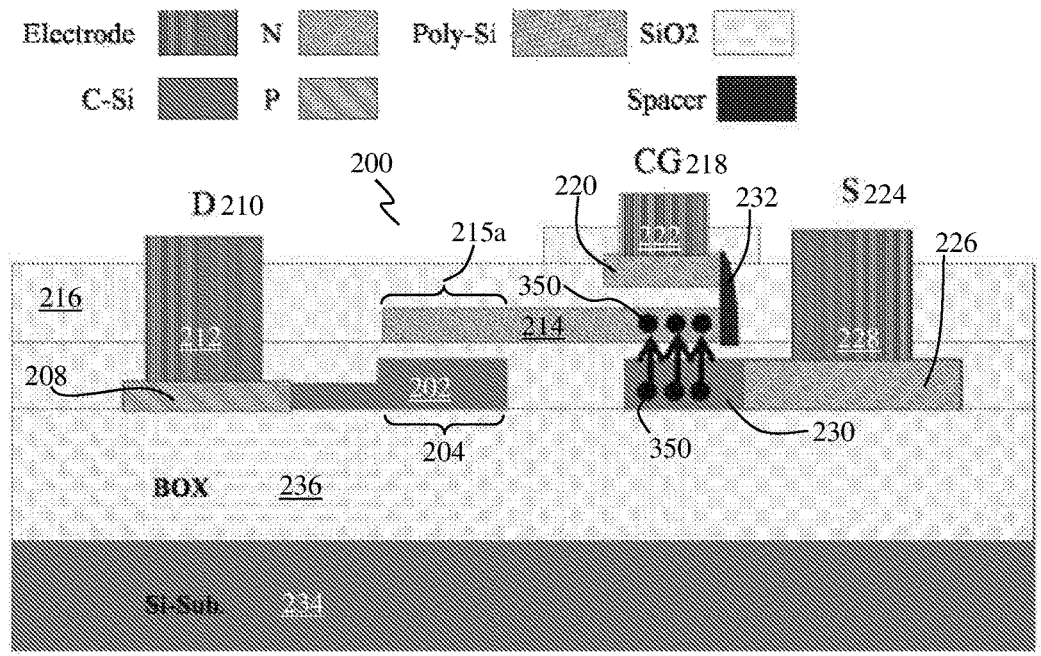
FIGS. 3A to 3C show, as cross-sectional views, the operating principle of the optical device of various embodiments.

Electrons pumping as illustrated in FIG. 3A: By applying a sufficient voltage to the electrical source 224 and the control gate, CG, 218, electrons (as represented by 350 for one electron) may get enough energy to tunnel through the isolator 216 that is between the floating gate, FG, 214 and the source 224. In this way, electrons 350 supplied from the source 224 may travel through the carrier injection portion 230, and then may tunnel through the insulating material 216 to the floating gate 214. That is, electrons 350 may tunnel from the source 224 to the floating gate 214. As a non-limiting example, the voltage at the source 224, $V_S$, may be set at 0V, the voltage at the control gate 218, $V_{CG}$, may be set at about 25 V, while the voltage at the drain 210, $V_D$, may be floating.

Figure 3B:
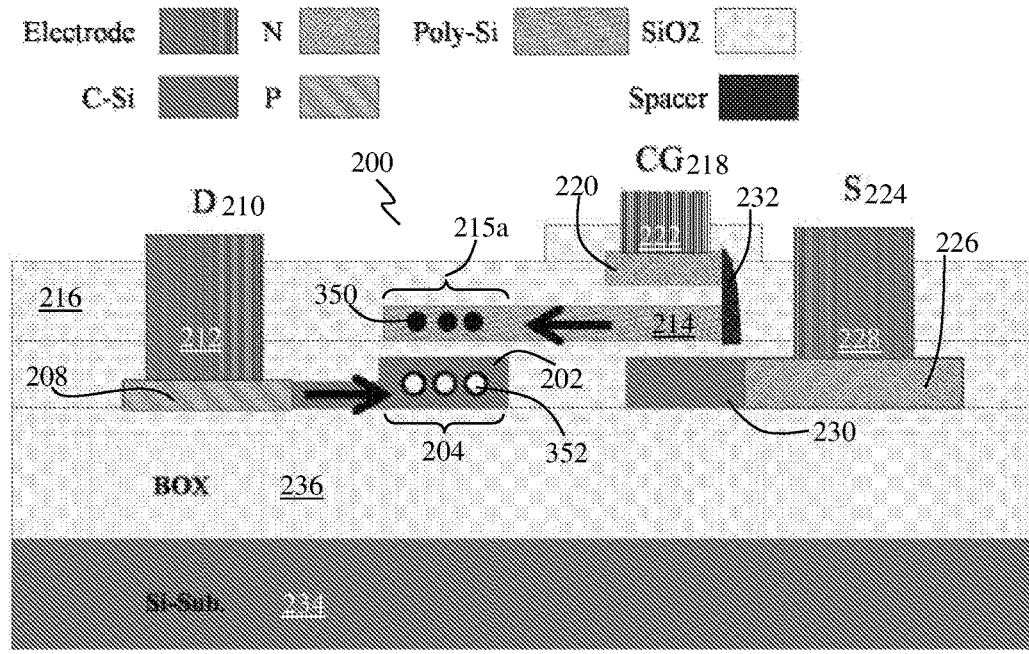

Electrons transporting (or moving charge) in the floating gate as illustrated in FIG. 3B: By supplying a voltage to the electrical drain 210, while keeping the source 224 and the CG 218 un-biased, the electrons 350 may move or be transported through the floating gate 214, from the memory (e.g., flash memory) side 239 to the waveguide structure side 238, for example to the rectangular portion 215a of the floating gate 214, and holes (as represented by 352 for one hole) from the drain 210 may move to the optical waveguide 202, for example, to the channel waveguide 204 that overlaps with the floating gate 214. The floating gate 214 therefore may act as a conducting path for the electrons 350. In this way, electrons 350 and holes 352 may be transported to the optical waveguide/FG interface or overlapping regions of the waveguide 202 and the floating gate 214. The carriers (electrons 350 and holes 352) may be confined close to or in the middle insulating material (e.g., an oxide) 216 arranged between the floating gate 214 and the optical waveguide 202 (which define a MOS structure), without recombining. This may improve the operation speed of the optical device 200.

The supplied voltage at the drain 210 should be kept low in order to prevent the electrons 350 from tunneling through the isolator 216 between the floating gate 214 and the drain 210. In other words, as $V_D$ is not sufficient to enable the electrons 350 from tunneling from the floating gate 214 to the drain 210, the electrons 350 may remain in the floating gate 214. The electrons 350 and the holes 352 are attracted to each other. The injected electrons 350 and holes 352 may change the (refractive) index of the waveguide structure 238, for example, at the optical waveguide 202 and/or the floating gate 214, and thus may subsequently induce optical phase change to an optical mode or optical signal propagating through the waveguide structure 238, and the switch defined by the optical device 200 may therefore be 'on', e.g., state '1'. As a non-limiting example, the voltage at the source 224, $V_S$, may be set at 0V, the voltage at the control gate 218, $V_{CG}$, may be set at 0V, while the voltage at the drain 210, $V_D$, may be set at about 18V.

Figure 3C:
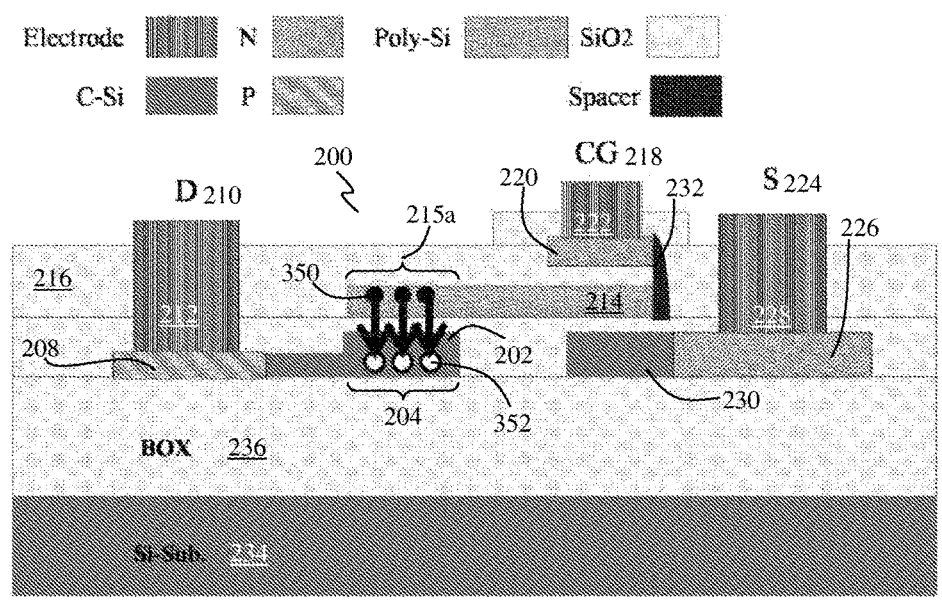

Erase as illustrated in FIG. 3C: The voltage at the CG 218, $V_{CG}$, may be set at 0V, and the drain voltage, $V_D$, at about 25V, for example, and the source terminal is left floating. The electrons 350 get enough energy to tunnel through the isolator 216 between the optical waveguide 202 and the floating gate 214. In this way, the electrons 350 may tunnel from the floating gate 214, through the insulating material 216, to the optical waveguide 202. The electrons 350 may be drawn completely. As the electrons 350 and the holes 352 are attracted to each other, the electrons 350 and the holes 352 recombine with each other. Therefore, the electrons 350 may be depleted. In this way, charge erase may occur. This change results in the optical phase change to 0, where the refractive index of the waveguide structure 238 may revert to its original or initial index. The switch defined by the optical device 200 may therefore be 'off', corresponding to state '0'. Therefore, in various embodiments, the incorporation of the drain terminal 210 in the optical device 200 may help to draw electrons 350 into the optical waveguide 202.

Simulation and preliminary testing results will now be described below by way of the following non-limiting examples. The optical performance of the optical waveguide structure (e.g., 238), which includes the optical waveguide (or slab waveguide) (e.g., 202), the floating gate (e.g., 214), and the isolator (e.g., 216).

FIG. 4A shows a diagram 460 of simulated optical mode of the waveguide structure, showing that the optical mode 461 is confined inside the waveguide structure 238. The respective dashed white rectangulars show the optical waveguide 202 and the floating gate 214. As may be observed, the optical mode 461 may be confined by and between the optical waveguide 202 and the floating gate 214. By injecting electrons/holes to the waveguide region, the optical refractive index of the waveguide structure 238 is changed, resulting in an optical phase change of the waveguide, which can be used for optical switching.

The electron pumping progress may be indicated by a current-voltage (I-V) curve by supplying voltage between the control gate (e.g., 218) and the source terminal (e.g., 224). FIG. 4B shows a plot 462 of current-voltage (I-V) curve between the source and the control gate, illustrating I-V characterization of the electron pumping process. The voltage is operated as a loop. The I-V curve shows hysteresis loop-like results. It proves that the floating gate is charged and also discharges electrons.

FIG. 4C shows a plot 464 of current-voltage (I-V) curve between the source and an N-type floating gate, which is obtained for testing of the tunneling voltage of the floating gate oxide (isolator). The tunneling voltage is about 6V.

FIG. 4D shows a plot 466 of current-voltage (I-V) curve between the source and a P-type floating gate, which is obtained for testing of the tunneling voltage of the floating gate oxide (isolator). The tunneling voltage is about 7V.

Figure 4E:
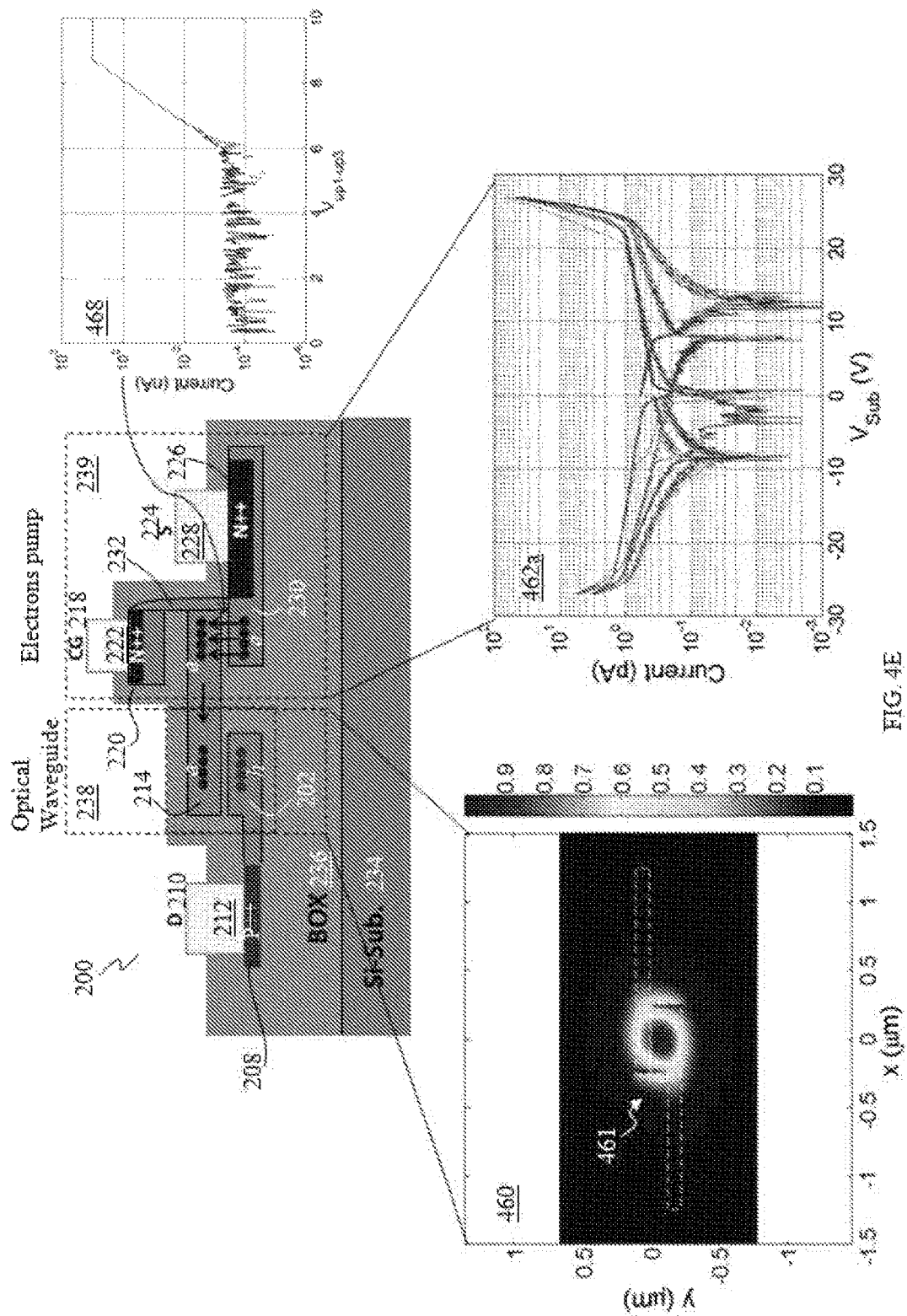
FIG. 4E shows an overall view of the optical device of various embodiments and the corresponding characterization results.

FIG. 4E shows an overall view of the optical device 200 of various embodiments and the corresponding simulated optical mode 461 (diagram 460), current-voltage (I-V) curve between the source and the control gate (plot 462a) and the current-voltage (I-V) curve between the source and the floating gate (plot 468).

Figure 5A:
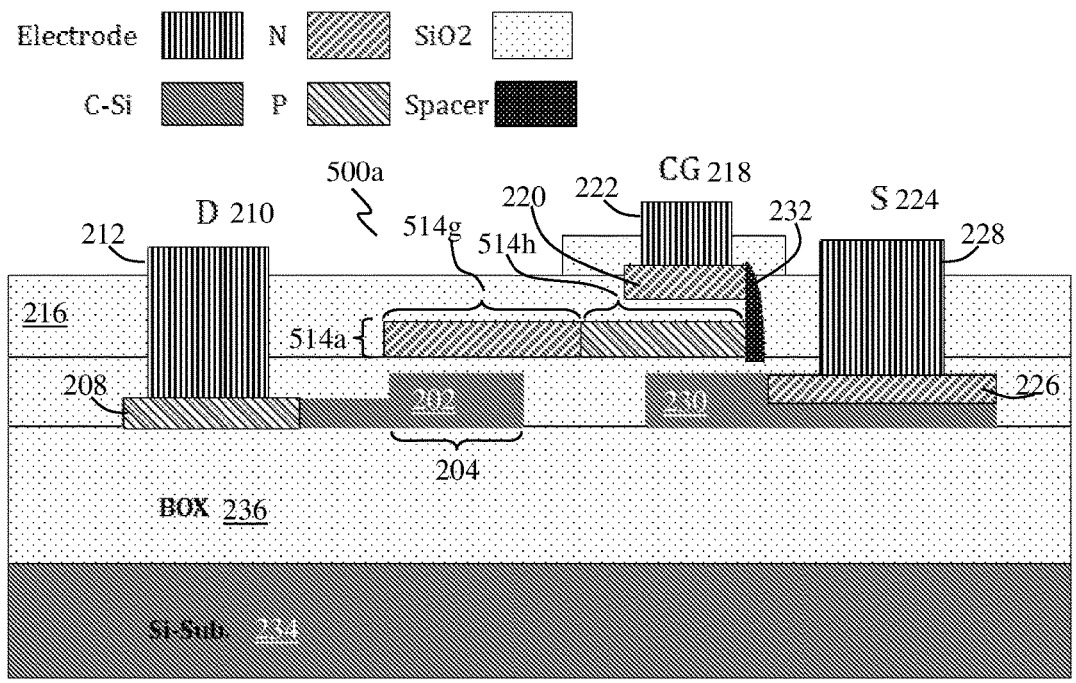
FIG. 5A shows a cross-sectional view of an optical device having a floating gate with a P-N junction, according to various embodiments.
Figure 5A:
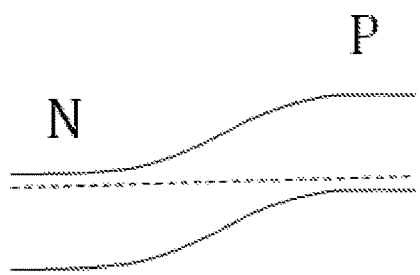
Figure 5B:
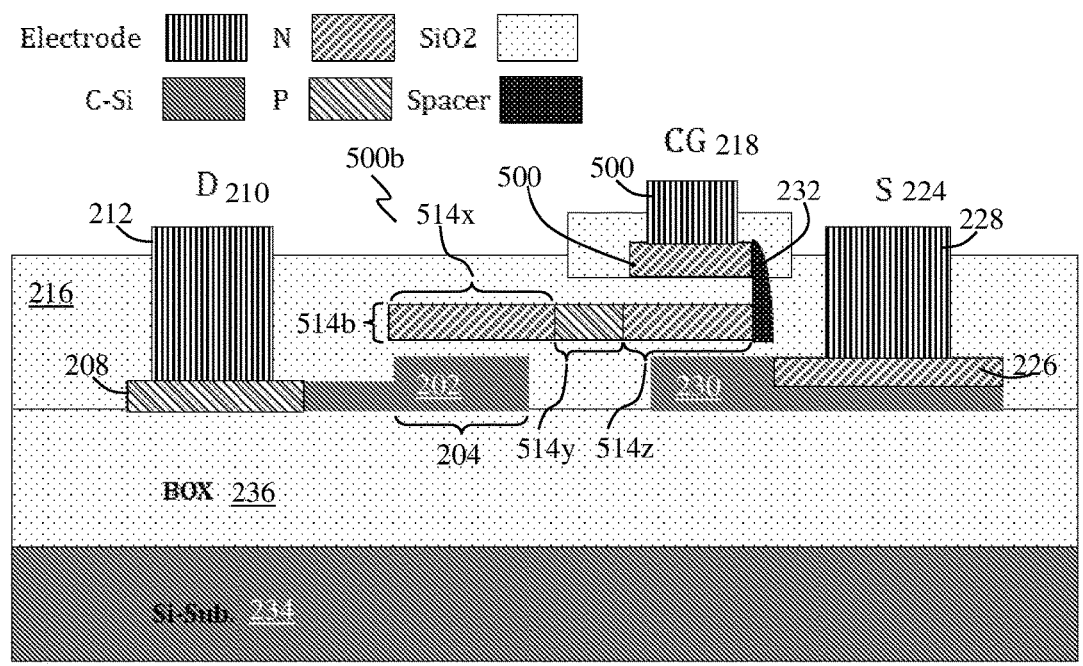
FIG. 5B shows a cross-sectional view of an optical device having a floating gate with an N-P-N junction, according to various embodiments.
Figure 5B:
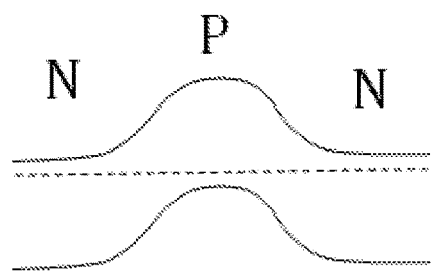

In various embodiments, bandgap engineering in the floating gate may be employed. For example, the floating gate region (e.g., made of polycrystalline silicon (Poly-Si)) of the optical device of various embodiments may be implanted with a P-N junction as shown in FIG. 5A or an N-P-N junction as shown in FIG. 5B. The corresponding bandgaps are also shown in FIGS. 5A and 5B. Adopting a P-N junction or an N-P-N junction in the floating gate may enhance the charge density. As a result, the efficiency of the optical device may be increased.

Referring to FIG. 5A, the optical device 500a may include the same or like elements or structures as those of the optical device 200 of FIGS. 2A and 2B, and as such, the same numerals are assigned and the like elements may be as described in the context of the optical device 200, and therefore the corresponding descriptions are omitted here. The optical device 500a includes a floating gate 514a which may be as correspondingly described in the context of the floating gate 214 of the optical device 200, except that the floating gate 514a may include an N-doped (or N-type) region 514g and a P-doped (or P-type) region 514h to define a P-N junction (or P-N structure). The N-doped region 514g and the P-doped region 514h may be arranged side-by-side laterally. The N-doped region 514g and the P-doped region 514h may be arranged in contact with each other, defining an interface therebetween. The N-doped region 514g may overlap with the optical waveguide 202, for example, overlap with the channel waveguide 204. The P-doped region 514h may overlap with the control gate 218 and/or the carrier injection portion 230 associated with the source terminal 224.

Referring to FIG. 5B, the optical device 500b may include the same or like elements or structures as those of the optical device 200 of FIGS. 2A and 2B, and as such, the same numerals are assigned and the like elements may be as described in the context of the optical device 200, and therefore the corresponding descriptions are omitted here. The optical device 500b includes a floating gate 514b which may be as correspondingly described in the context of the floating gate 214 of the optical device 200, except that the floating gate 514b may include a first N-doped (or N-type) region 514x, a P-doped (or P-type) region 514y and a second N-doped (or N-type) region 514z to define an N-P-N junction (or N-P-N structure). The first N-doped region 514x, the P-doped region 514y and the second N-doped region 514z may be arranged side-by-side laterally. The P-doped region 514y may be formed between the first N-doped region 514x and the second N-doped region 514z. The first N-doped region 514x and the P-doped region 514y may be arranged in contact with each other, defining an interface therebetween. The P-doped region 514y and the second n-doped region 514z may be arranged in contact with each other, defining an interface therebetween. The first N-doped region 514x and the P-doped region 514y define a first P-N junction, and the second N-doped region 514z and the P-doped region 514y define a second P-N junction, with the P-doped region 514y common to the two P-N junctions. Therefore, two back-to-back P-N junctions may be defined in the floating gate 514b.

The first N-doped region 514x may overlap with the optical waveguide 202, for example, overlap with the channel waveguide 204. The second N-doped region 514z may overlap with the control gate 218 and/or the carrier injection portion 230 associated with the source terminal 224.

Compared with the P-N junction case of the optical device 500a, the N-P-N structure of the optical device 500b requires relatively small pumping voltage (see FIGS. 4C and 4D). For the P-N junction, after electrons are pumped into the floating gate 514a which is the P-type terminal (or P-type region) 514h, the electrons may move to the N-type terminal (or N-type region) 514g by the P-N junction built-in electrical field. For the N-P-N junction, the pumped electrons need an external voltage to move from the second N-type region 514z to the P-type region 514y Implanting the floating gate as N-P junction and N-P-N junction may control the electrons in the left side (which overlaps with the optical waveguide 202) of the floating gate 514a, 514b efficiently.

FIGS. 6A to 6F show perspective views of various optical devices 600a, 600b, 600c, 600d, 600e, 600f of various embodiments, illustrating various memory and programming optical device architectures. The optical devices 600a, 600b, 600c, 600d, 600e, 600f may include the same or like elements or structures as those of the optical device 200 of FIGS. 2A and 2B, and as such, the same numerals are assigned and the like elements may be as described in the context of the optical device 200, and therefore the corresponding descriptions are omitted here.

Figure 6A:
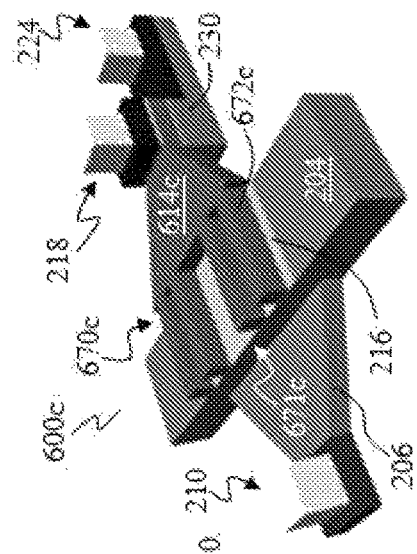
FIGS. 6A to 6F show perspective views of various optical devices of various embodiments.

Referring to FIG. 6A, the optical device 600a includes a waveguide 604a which may be as correspondingly described in the context of the waveguide 204 of the optical device 200. The waveguide 604a may be employed in an interferometer, for example, in a Mach-Zehnder interferometer (MZI) structure, as an interferometer arm. In further embodiments, the waveguide 604a may be employed as a resonator, for example, in a microring resonator as will be described below with reference to FIGS. 7, 8A and 8B.

Figure 6B:
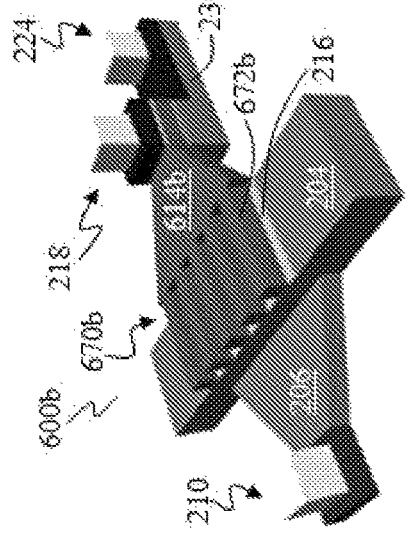

Referring to FIG. 6B, the optical device 600b includes a floating gate 614b which may be as correspondingly described in the context of the floating gate 214 of the optical device 200, except that the floating gate 614b may include a grating structure 670b. The grating structure 670b may be arranged overlapping with the waveguide 204. The grating structure 670b may be spaced apart from the waveguide 204 with an isolator or insulation material 216 therebetween. The grating structure 670b may include a plurality of spaced apart elongate structures or fingers 672b. The plurality of fingers 672b may be spaced apart from each other at least substantially uniformly (i.e., the period of the grating structure 670b may be at least substantially uniform). The longitudinal axes of the fingers 672b may be parallel to the width of the waveguide 204.

Figure 6C:
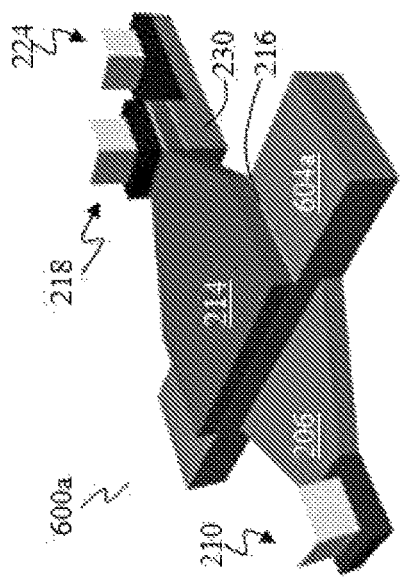

Referring to FIG. 6C, the optical device 600c includes a floating gate 614c which may be as correspondingly described in the context of the floating gate 214 of the optical device 200, except that the floating gate 614c may include a grating structure 670c, in the form of a defect grating structure. The grating structure 670c may be arranged overlapping with the waveguide 204. The grating structure 670c may be spaced apart from the waveguide 204 with an isolator or insulation material 216 therebetween. The grating structure 670c may include a plurality of spaced apart elongate structures or fingers 672c. The plurality of fingers 672c may be spaced apart from each other non-uniformly. For example, two separate sets of fingers 672c (thereby effectively defining two separate gratings), each set having a predetermined period, may be spaced apart from each other by a "defect", in the form of a (micro)cavity or a spacing 671c. This may mean that there is a (micro)cavity 671c within the floating gate 614c. The spacing 671c may be larger than the predetermined period. The longitudinal axes of the fingers 672c may be parallel to the width of the waveguide 204.

Generally, a grating (e.g., 670b, FIG. 6B) functions like a mirror, where light of a predetermined wavelength or wavelength range may be reflected by the grating, while light of other wavelengths may be transmitted. However, by having two gratings with a space 671c between them, the defect grating structure 670c becomes a cavity and functions more like a narrow(band) filter, where light of only a very narrow wavelength range may pass or be transmitted through the defect grating structure 670c.

Figure 6D:
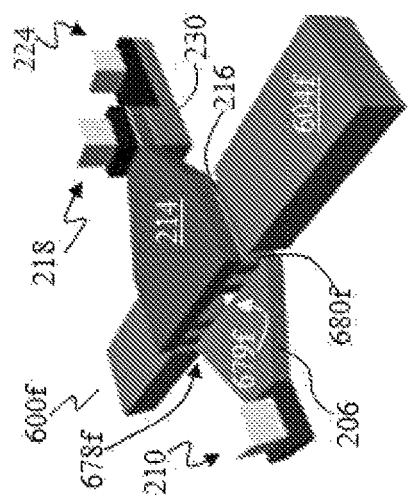

Referring to FIG. 6D, the optical device 600d includes a waveguide (e.g., silicon waveguide) 604d which may be as correspondingly described in the context of the waveguide 204 of the optical device 200, except that the waveguide 604d may be embedded with openings or microcavities 674d. This may mean that the waveguide 604d may include a plurality of spaced apart waveguide portions 676d with a respective microcavity 674d in between two adjacent waveguide portions 676d. The microcavities 674d may be arranged outside of the floating gate 214, meaning non-overlapping with the floating gate 214. The microcavities 674d may be provided on opposite sides of the floating gate 214.

Figure 6E:
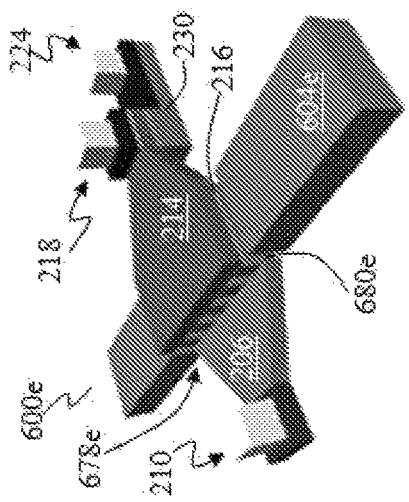

Referring to FIG. 6E, the optical device 600e includes a waveguide (e.g., silicon waveguide) 604e which may be as correspondingly described in the context of the waveguide 204 of the optical device 200, except that the waveguide 604e may include an embedded grating 678e. The grating structure 678e may be arranged overlapping with the floating gate 214. The grating 678b may be spaced apart from the floating gate 214 with an isolator or insulation material 216 therebetween. The grating 678b may include alternating regions of first (e.g., high) refractive index and second (e.g., low) refractive index. The grating 678e may be spaced apart from the remaining portion (e.g., portion non-overlapping with the floating gate 214) of the waveguide 604e by an opening 680e.

Figure 6F:
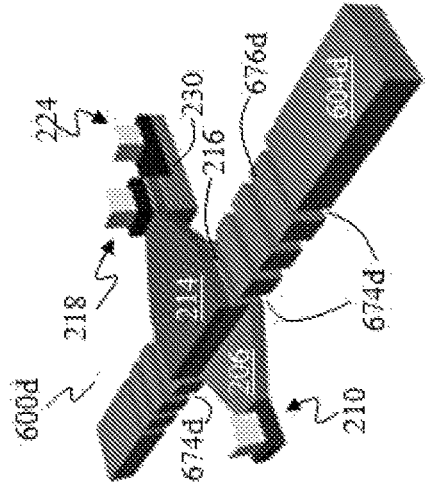

Referring to FIG. 6F, the optical device 600f includes a waveguide (e.g., silicon waveguide) 604f which may be as correspondingly described in the context of the waveguide 204 of the optical device 200, except that the waveguide 604f may include an embedded grating 678f, in the form of a defect grating. The grating 678f may be arranged overlapping with the floating gate 214. This may mean that the defect grating 678f may be covered by the floating gate 214. The grating 678f may be spaced apart from the floating gate 214 with an isolator or insulation material 216 therebetween. The grating 678f may include at least two grating portions spaced apart from each other by a gap 679f. The grating 678f may be spaced apart from the remaining portion (e.g., portion non-overlapping with the floating gate 214) of the waveguide 604f by an opening 680f.

Figure 7:
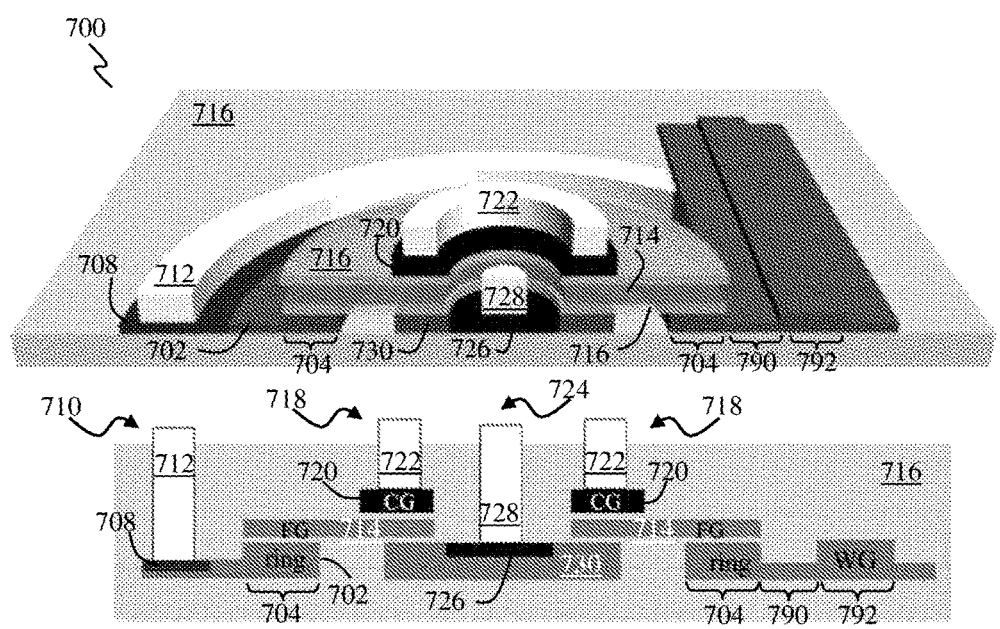
FIG. 7 shows a perspective view and a cross-sectional view of an optical device, according to various embodiments.

FIG. 7 shows a perspective view and a cross-sectional view of an optical device 700, according to various embodiments. It should be appreciated that the perspective view shows only half of the optical device 700 and in a titled view. The optical device 700 may be a resonator such as a (micro)ring resonator. Like features or components of the optical device 700 that are similarly present in the optical device 200 are denoted by like reference numerals increased by 500, and which may be as correspondingly described in the context of the optical device 200 and therefore are omitted here. The differences of the optical device 700 as compared to the optical device 200 may be as follows.

The electrode 728 and the associated doped portion 226 of the source terminal 724 and the carrier injection portion 730 may be at least substantially circular. The electrode 722 and the associated doped portion 720 of the control gate 718 may be at least substantially circular, for example, in the form of a ring. The electrode 722 and the doped portion 720 may at least substantially surround the source terminal 724. The floating gate 714 may be at least substantially circular, for example, in the form of a ring. The floating gate 714 may at least substantially surround the source terminal 724. The waveguide 704 may be at least substantially circular, for example, in the form of a ring. This may mean that the waveguide 704 may be a microring or a ring waveguide. The waveguide 704 may at least substantially surround the source terminal 724 and the carrier injection portion 730. The electrode 712 and the associated doped portion 708 of the drain terminal 710 may be curved, and partially surrounding the waveguide 704, the floating gate 714, the control gate 718, the source terminal 724 and the carrier injection portion 730.

The waveguide 704 may be optically coupled to an additional waveguide (e.g., a channel waveguide) 792. A slab waveguide portion 790 may be provided in between to optically couple light or optical signal between the waveguides 704, 792. The waveguide 792 may be an input waveguide that optically couples an optical signal into the waveguide 704 or may be an output waveguide that optically couples an optical signal from the waveguide 704. While not shown, the optical device 700 may be formed on a silicon-on-insulator (SOI) wafer having a silicon substrate and a buried oxide (BOX) layer.

Figure 8A:
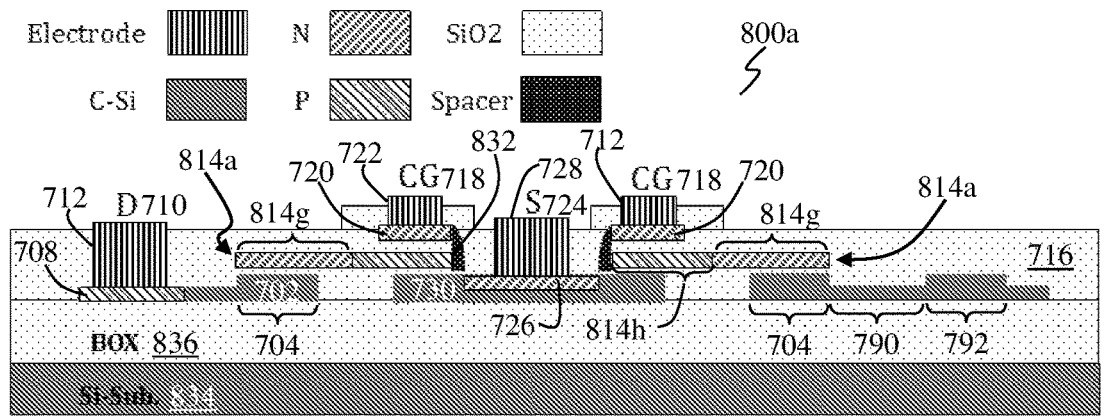
FIGS. 8A and 8B show cross-sectional views of various optical devices of various embodiments.

FIG. 8A shows a cross-sectional view of an optical device 800a, according to various embodiments. The optical device 800a may include the same or like elements or structures as those of the optical device 700 of FIG. 7, and as such, the same numerals are assigned and the like elements may be as described in the context of the optical device 700, and therefore the corresponding descriptions are omitted here. The optical device 800a includes a floating gate 814a which may be as correspondingly described in the context of the floating gate 714 of the optical device 700, except that the floating gate 814a may include an N-doped (or N-type) region 814g and a P-doped (or P-type) region 814h to define a P-N junction (or P-N structure). The N-doped region 814g and the P-doped region 814h may be arranged side-by-side laterally. The N-doped region 814g and the P-doped region 814h may be arranged in contact with each other, defining an interface therebetween. The N-doped region 814g may overlap with the optical waveguide 702, for example, overlap with the ring waveguide 704. The P-doped region 814h may overlap with the control gate 718 and/or the carrier injection portion 730 associated with the source terminal 724. A spacer 832 may be provided, coupled to the floating gate 814a and the control gate 718. The spacer 832 may be employed to assist in spacing apart the floating gate 814a and the control gate 718. As shown in FIG. 8A, the optical device 800a may be formed on a silicon-on-insulator (SOI) wafer having a silicon substrate 834 and a buried oxide layer (BOX) 836.

Figure 8B:
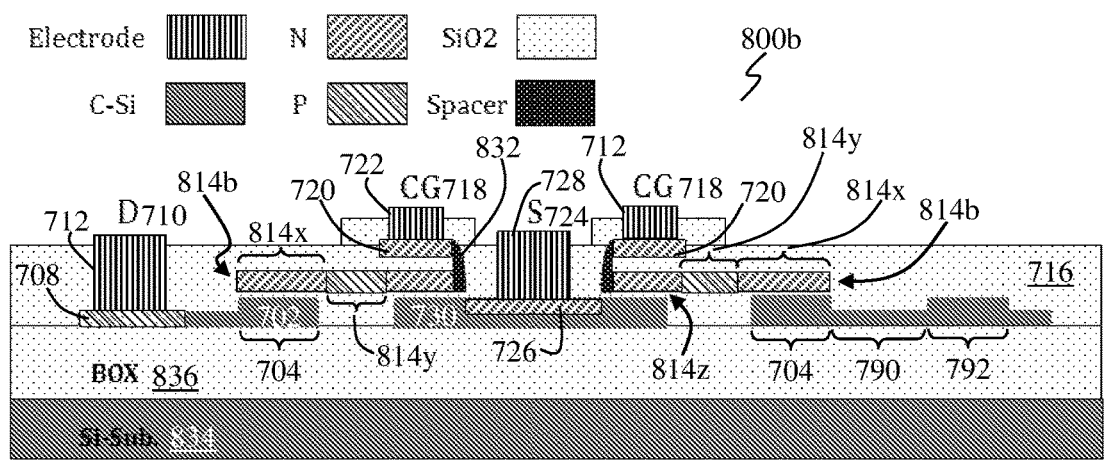

FIG. 8B shows a cross-sectional view of an optical device 800b, according to various embodiments. The optical device 800b may include the same or like elements or structures as those of the optical device 700 of FIG. 7, and as such, the same numerals are assigned and the like elements may be as described in the context of the optical device 700, and therefore the corresponding descriptions are omitted here. The optical device 800b includes a floating gate 814b which may be as correspondingly described in the context of the floating gate 714 of the optical device 700, except that the floating gate 814b may include a first N-doped (or N-type) region 814x, a P-doped (or P-type) region 814y and a second N-doped (or N-type) region 814z to define an N-P-N junction (or N-P-N structure). The first N-doped region 814x, the P-doped region 814y and the second N-doped region 814z may be arranged side-by-side laterally. The P-doped region 814y may be formed between the first N-doped region 814x and the second N-doped region 814z. The first N-doped region 814x and the P-doped region 814y may be arranged in contact with each other, defining an interface therebetween. The P-doped region 814y and the second n-doped region 814z may be arranged in contact with each other, defining an interface therebetween. The first N-doped region 814x and the P-doped region 814y defines a first P-N junction and the second N-doped region 814z and the P-doped region 814y defines a second P-N junction, with the P-doped region 814y common to the two P-N junctions. Therefore, two back-to-back P-N junctions may be defined in the floating gate 814b.

The first N-doped region 814x may overlap with the optical waveguide 702, for example, overlap with the ring waveguide 704. The second N-doped region 814z may overlap with the control gate 718 and/or the carrier injection portion 730 associated with the source terminal 724.

A spacer 832 may be provided, coupled to the floating gate 814b and the control gate 718. The spacer 832 may be employed to assist in spacing apart the floating gate 814b and the control gate 718. As shown in FIG. 8B, the optical device 800b may be formed on a silicon-on-insulator (SOI) wafer having a silicon substrate 834 and a buried oxide layer (BOX) 836.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An optical device comprising:
 a waveguide structure comprising:
  a floating gate; and
  an optical waveguide arranged spaced apart from the floating gate, wherein the optical waveguide overlaps with the floating gate;
 a carrier injection portion arranged spaced apart from the floating gate; and
 an electrode arrangement comprising:
  a control gate terminal, wherein the floating gate is arranged in between the control gate terminal and the carrier injection portion;
  a first source/drain terminal coupled to the carrier injection portion; and
  a second source/drain terminal coupled to the optical waveguide,
 wherein the optical waveguide overlaps with a first portion of the floating gate,
 wherein the carrier injection portion overlaps with a second portion of the floating gate,
 wherein, in response to a first voltage difference applied between the control gate terminal and the first source/drain terminal, the optical device is configured to inject charge carriers from the carrier injection portion to the floating gate to cause a change in refractive index of the waveguide structure,
 wherein, in response to a second voltage difference applied between the control gate terminal and the second source/drain terminal, the optical device is configured to drive the charge carriers from the floating gate to the optical waveguide to deplete the charge carriers; and
 wherein, in response to a third voltage difference applied between the control gate terminal and the second source/drain terminal, the third voltage difference being less than the second voltage difference, the optical device is configured to drive the charge carriers injected from the carrier injection portion to the second portion of the floating gate through the floating gate to the first portion of the floating gate overlapping with the optical waveguide.

2. The optical device as claimed in claim 1, wherein the waveguide structure comprises an insulating material in between the optical waveguide and a portion of the floating gate overlapping with the optical waveguide.

3. The optical device as claimed in claim 1, wherein the optical waveguide is arranged spaced apart from the carrier injection portion.

4. The optical device as claimed in claim 1, wherein the optical waveguide is electrically insulated from the carrier injection portion.

5. The optical device as claimed in claim 1, wherein the optical waveguide comprises a channel waveguide.

6. The optical device as claimed in claim 1, wherein the optical waveguide comprises a slab waveguide portion coupled to the second source/drain terminal, the slab waveguide portion being tapered with a width increasing in a direction away from the second source/drain terminal.

7. The optical device as claimed in claim 1, wherein the floating gate comprises a tapering portion having a width decreasing in a direction away from the optical waveguide.

8. The optical device as claimed in claim 1, wherein the floating gate comprises dopants.

9. The optical device as claimed in claim 1, wherein the floating gate comprises a P-N junction, wherein an N-doped region of the P-N junction overlaps with the optical waveguide.

10. The optical device as claimed in claim 1, wherein the floating gate comprises an N-P-N junction, wherein one N-doped region of the N-P-N junction overlaps with the optical waveguide.

11. The optical device as claimed in claim 1, wherein the floating gate comprises a grating structure arranged overlapping with the optical waveguide.

12. The optical device as claimed in claim 1, wherein the optical waveguide comprises a grating arranged overlapping with the floating gate.

13. The optical device as claimed in claim 1, wherein a plurality of cavities are defined in the optical waveguide.

14. The optical device as claimed in claim 1, wherein the optical waveguide comprises a ring waveguide, and the floating gate comprises a ring floating gate.

15. The optical device as claimed in claim 14, further comprising a second optical waveguide optically coupled to the ring waveguide.

16. A method of controlling an optical device comprising a waveguide structure, the method comprising:
 applying a first voltage difference between a control gate terminal of an electrode arrangement of the optical device and a first source/drain terminal of the electrode arrangement to inject charge carriers from a carrier injection portion of the optical device to a floating gate of the waveguide structure to cause a change in refractive index of the waveguide structure, wherein the carrier injection portion is arranged spaced apart from the floating gate, wherein the floating gate is arranged in between the control gate terminal and the carrier injection portion, and wherein the first source/drain terminal is coupled to the carrier injection portion;
 applying a second voltage difference between the control gate terminal and a second source/drain terminal of the electrode arrangement to drive the charge carriers from the floating gate to an optical waveguide of the waveguide structure to deplete the charge carriers, wherein the optical waveguide is arranged spaced apart from the floating gate and overlapping with the floating gate, wherein the second source/drain terminal is coupled to the optical waveguide; and
 prior to applying the second voltage difference, applying a third voltage between the control gate terminal and the second source/drain terminal to drive the charge carriers injected from the carrier injection portion to a second portion of the floating gate overlapping with the carrier injection portion through the floating gate to a first portion of the floating gate overlapping with the optical waveguide, wherein the third voltage difference is less than the second voltage difference.

* * * * *